United States Patent [19]
Ganssle et al.

[11] 3,765,775
[45] Oct. 16, 1973

[54] OPTICAL INTERNAL QUALITY ANALYZER

[75] Inventors: Eugene R. Ganssle, Silver Spring; Donald R. Webster, Laurel, both of Md.

[73] Assignee: Neotec Corporation, Rockville, Md.

[22] Filed: Mar. 15, 1972

[21] Appl. No.: 234,843

[52] U.S. Cl.............. 356/188, 356/189, 356/195, 356/205, 356/212, 356/244
[51] Int. Cl. ..... G01j 3/48, G01n 21/22, G01j 21/48
[58] Field of Search.................. 356/173, 188, 189, 356/195, 204, 205, 209, 210, 211, 212, 244

[56] References Cited
UNITED STATES PATENTS

| | | | |
|---|---|---|---|
| 3,690,772 | 9/1972 | Endl | 356/205 |
| 3,486,822 | 12/1969 | Harris | 356/83 |
| 3,694,092 | 9/1972 | Hashimoto et al. | 356/188 |
| 3,661,462 | 5/1972 | Natens | 356/188 |
| 3,016,788 | 1/1962 | Smith | 356/189 |
| 3,646,331 | 2/1972 | Lord | 356/205 |
| 2,882,785 | 4/1959 | Biesele, Jr. | 356/212 |

Primary Examiner—David Schonberg
Assistant Examiner—V. P. McGraw
Attorney—Joseph M. Lane et al.

[57] ABSTRACT

A system for measuring the optical density of an object in which the object is illuminated with light of different wavelengths in a continuous sequence. The level of light transmitted through or, alternatively, reflected by the object during each illumination is measured by means of a photodetector. The photodetector output for each wavelength is converted in an analyzer unit to a measurement of transmissive or reflective optical density. The analyzer unit is controlled by selected synchronization signals which are generated during illumination and correspond to the illumination sequence. The analyzer unit samples and stores values of optical density at a pair of wavelengths corresponding to the synchronization signals and produces a digital output representing either absolute optical density at one of the wavelengths or the difference between the optical densities at the pair of wavelengths.

13 Claims, 3 Drawing Figures

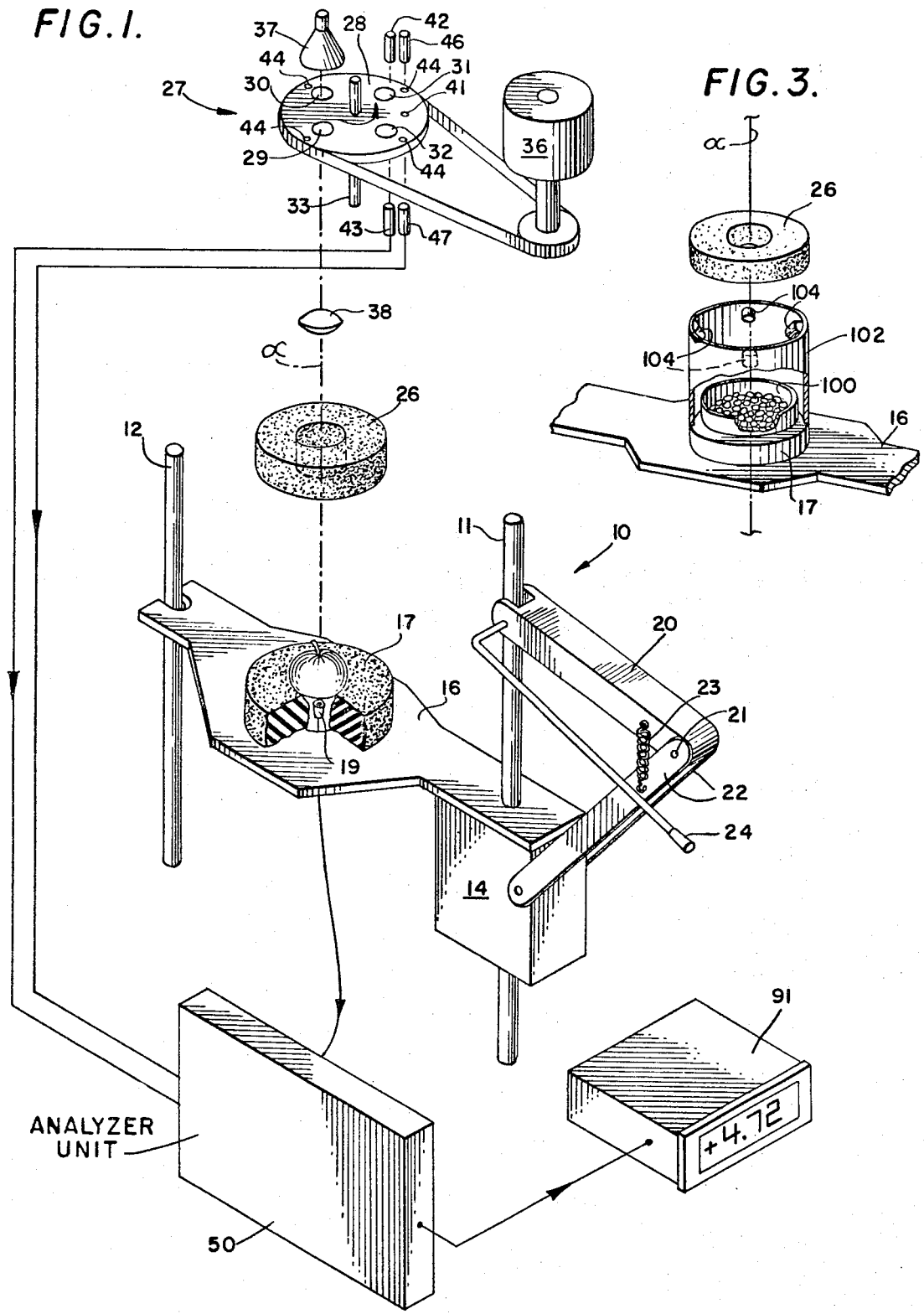

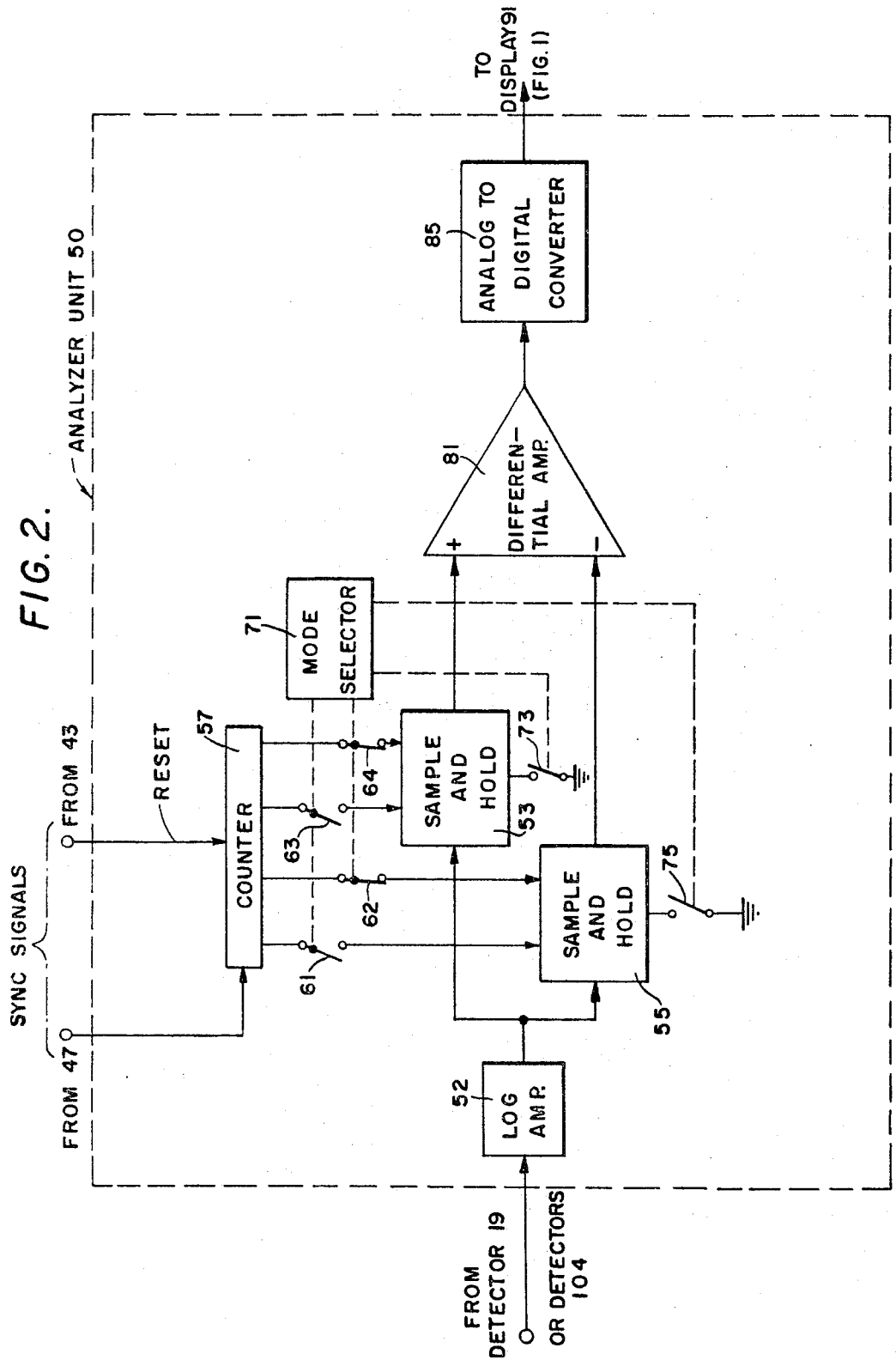

OPTICAL INTERNAL QUALITY ANALYZER

BACKGROUND OF THE INVENTION

The invention relates generally to the field of instruments for measuring light transmittance of reflectance, and more particularly to improve apparatus for measuring and comparing optical densities of organic materials at various wavelengths.

Prior researchers have confirmed that non-destructive light transmittance tests on various agricultural products can be indicative of their internal quality. Predictable transmittance characteristics have now been attributed to various structural properties including specific horticultural defects such as water core in apples and hollow hearts in potatoes. Prior art devices for producing such measurements lacked versatility and depended to a high degree on manual operation and adjustment to obtain readings for different size objects at several different wavelengths.

SUMMARY OF THE INVENTION

Accordingly, the general purpose of the invention is to measure and display automatically transmittance or reflectance levels at several different wavelengths of light. Another object of the invention is to measure and display differences in optical density for several pairs of wavelengths. A further object of the invention is to simplify the positioning of objects for uniform measurements of optical density. Still another object of the invention is to enable instantaneous switching among measurements of absolute optical density at different wavelengths and differences in optical density for several pairs of wavelengths.

These and other objects of the invention are achieved by providing a self positioning carriage having a cushioned platform on which test objects such as whole apples can be placed. The platform contains a centrally located photodiode detector. The test object is illuminated by light from a high intensity source sequentially filtered by a continuously rotating disc having a plurality of optical filters. Synchronizing means are located on the disc to indicate, by means of a detection system, which one of the filters is in operating position, i.e., in the optical path, at any given time. In one embodiment apertures are spaced about the disc and the detection system includes light sources and photodetectors aligned on opposite sides of the wheel to provide synchronization (sync) signals.

The output of the photodiode detector on the test platform represents the intensity of transmitted light, but the ease of transmitting light through the object is read in terms of "transmissive optical density" (OD), related to intensity by the formula $OD = \log_{10} (I_i/I_t$, where $I_i$ is the intensity of incident light or the measured light intensity with no specimen, and $I_t$ is the intensity of transmitted light or the measured light intensity through the specimen. Differences between OD readings for a particular pair of wavelengths are the most meaningful and characteristic measurement for certain types of internal quality evaluation, such as the maturity of apples. To produce a direct transmissive optical density difference ($\Delta OD$) reading, an analyzer unit provides a logarithmic amplifier which receives the photodiode detector output. The output of the logarithmic amplifier is linearly related to OD. A pair of sample and hold circuits receives the output of the logarithmic amplifier. A digital counter operated by the sync signals provides parallel outputs, each marking the time when a corresponding filter passes through the optical path. One counter output is chosen to gate each sample and hold circuit. The continuously updated outputs of the hold circuits are fed to opposite inputs of a differential amplifier whose analog outputs is linearly related to $\Delta OD$. The differential amplifier output is converted to digital form for driving a digital display of $\Delta OD$ for the selected pair of wavelengths. To read absolute OD for a single filter, the output of one of the sample and hold circuit is inhibited, for example, by grounding the circuit.

Useful measurements may also be obtained by locating photodiodes to receive light reflected from the specimen during the illumination sequence. The photodiode output is fed to the analyzer unit which operates in the same manner as for the transmittance measurement $\Delta OD$. However, in this case the reading is based on reflectivity of the specimen. The case of reflecting light from the specimen is measured in terms of "reflective optical density" (RD), which is defined herein by the formula $RD = \log_{10} (I_i/I_r$, where $I_i$ represents the intensity of incident light and $I_r$ represents the intensity of reflected light. By sampling the intensity of reflected light at different wavelengths, the analyzer unit reads out either absolute RD, based on the logarithm of reflective intensity for one wavelength, or the difference between reflective optical densities ($\Delta RD$) for a pair of wavelengths.

BRIEF DESCRIPTION OF THE DRAWINGS

FIG. 1 is a block and schematic diagram illustrating one embodiment of the invention.

FIG. 2 is a block and schematic diagram illustrating the electronic analyzer unit of FIG. 1 in more detail.

FIG. 3 is a partial schematic diagram illustrating another embodiment of the invention in which the device of FIG. 1 is adapted to measure reflectance.

DESCRIPTION OF THE PREFERRED EMBODIMENTS

Referring now to FIG. 1 of the drawings, a carriage assembly 10 comprises a pair of guide rails 11 and 12 with a carriage 14 slidably mounted on guide rail 11. A specimen platform 16 is secured at one end to the top of carriage 14 and is notched at the other end to slidably engage rail 12 preventing lateral displacement. A lower cushion 17, located on top of platform 16, provides a mount for the specimen to be tested. Cushion 17 has a central aperture over which an object such as an apple is placed. A photosensitive element 19 is positioned in the aperture for sensing light transmission through the specimen. For raising and lowering platform 16, an upper arm 20 is pivotally connected at one end to guide rail 11 above carriage 14, or to any other non-moving part of the system. The other end of upper arm 20 is pivotally connected by a pin 21 to one of each of a pair of parallel lower arms 22. A spring 23 urges arm 20 towards arms 22 about pin 21. The other ends of lower arms 22 are pivotally connected to opposite sides of sliding carriage 14. A handle 24 is rigidly connected at one end to upper arm 20. When the free end of handle 24 is moved, upper arm 20 is caused to pivot about its fixed point of connection. At the same time, carriage 14 slides along guide rail 11 because of its pivotal connection to the other end of upper arm 20 by means of lower arms 22. Thus, movement of handle 24 alters the level of platform 16 which is secured to carriage 14 with the platform being movable between a fixed lower position, in which the specimen is loaded onto cushion 17, and an upper position defined by the location of an annular fixed cushion 26, in which the specimen is analyzed in a manner to be explained in detail later.

In order to move platform 16 to the above-mentioned fixed lower position, handle 24 is rotated clockwise, as viewed in FIG. 1, past the point where upper arm 20 is aligned with lower arms 22, until the interconnected ends of arm 20 and arms 22 rest against rail 11. In this position, spring 23 would be located slightly to the right of pin 21, causing arm 20 and arm 22 to be maintained in a locked, over-center relationship despite release of the handle 24. After a specimen is mounted on lower cushion 17, handle 24 is rotated counterclockwise, back towards it original position raising platform 16 to a level at which the mounted specimen is forced against upper cushion 26 which serves as a stop. The platform is retained in the upper position, by spring 23, after release of handle 24.

An illuminating system, shown in general by the reference numeral 27 in FIG. 1, is provided in a spaced relation to carriage assembly 10, and comprises a filter wheel 28, in the form of an apertured disc in which four different optical filters 29, 30, 31 and 32 are located equally spaced about a central axle 33. Filter wheel 28 is belt driven at a continuous speed by a motor 36. A fixed high intensity lamp 37 is spaced appropriately from axle 33 and is arranged to shine light through filters 29–32 as they pass in sequence beneath lamp 37. A fixed, converging lens system 38 is located in the optical path between lamp 37 and the upper cushion 26 and is adapted to focus the light from lamp 37 onto the specimen.

Filter wheel 28 has a aperture 41 provided therethrough and located at a first radial distance angularly between two adjacent filters. A light source 42 is provided above filter wheel 28 and is spaced from axle 33 by the first radial distance. When aperture 41 is in registration directly below light source 42, light is passed to a photosensitive element 43 rigidly aligned with light source 42 below filter wheel 28. As the wheel spins, one output pulse from element 43 marks every complete revolution.

Four other apertures 44 are located respectively beside filters 29–32 at a second radial distance from axle 33 with this second radial distance being greater than the first radial distance. Another light source 46 and photosensitive element 47 are aligned on opposite sides of filter wheel 28 at the second radial distance from axle 33. As a result, each time one of filters 29–32 registers with lamp 37, a corresponding one of apertures 44 registers with light source 46 permitting light to pass to element 47 and an output pulse to be generated. Thus, element 47 produces four output pulses per revolution of wheel 28.

The outputs from the photosensitive elements 43 and 47 and from the photodetector 19 are connected to an analyzer unit 50 which is shown in detail in FIG. 2. In particular, the unit 50 includes a longarithmic amplifier 52 which receives the output from the photodetector 19 and produces an output which is linearly related to absolute OD for the sequentially filtered light. A pair of sample and hold circuits 53 and 55 are connected to receive the output of amplifier 52. In order to sample the sequential output of amplifier 52 at times corresponding to the registration of a particular filter in the optical path $\alpha$, circuits 53 and 55 are controlled by a digital counter 57. Counter 57 receives the pulse outputs of photosensitive elements 43 and 47 as sync signals. The output of element 47 serves as a load input to counter 57 and the output of element 43 resets the counter to zero. Counter 57 has four parallel outputs which are sequentially activated one at a time, and which correspond respectively to filters 29–32. The counter outputs provide timing or gate pulses for sample and hold circuits 53 and 55.

Counter 57 is implemented so that only its first output is pulsed when the first output from element 47 is received. The second output of counter 57 is pulsed on receipt of the second pulse from element 47. After the third and fourth outputs of counter 57 have been individually pulsed on the occurrence of the third and fourth outputs of element 47, element 43 produces one reset pulse, due to the completion of one revolution of wheel 28. Accordingly, on the next output pulse from detector 47, the first counter output is again pulsed. The rest of the sequence is similarly repeated.

Switches 61, 62, 63 and 64 are located respectively in the counter output lines. A mode selector 71, which may be a manually operated ganged switch, can be activated to close either of two pairs of switches 61 and 63, or 62 and 64. For example, if the latter pair of switches, 62 and 64, are both closed as shown in FIG. 2, hold circuit 55 samples the output of the logarithmic amplifier at a time when the second filter, filter 29, for instance, is in the optical path and retains or stores that value until, in the next cycle, the same filter is sampled again to update the output of hold circuit 55. Likewise, hold circuit 53 samples the amplifier output when the fourth filter is in position, for instance, filter 31, and continues to update the value for the filter each time it passes beneath lamp 37.

The output of hold circuit 53 is passed to one input of a differential amplifier 81, while the output of hold circuit 55 is passed to the differential amplifier's opposite input. The output of amplifier 81 is linearly related to the algebraic difference, $\Delta OD$, between the hold circuit outputs at any given time. If the absolute OD for one particular filter is desired, instead of $\Delta OD$ for two filters, the appropriate pair of switches for the counter outputs, including the one corresponding to the desired filter, is activated, and the hold circuit which would receive the data on the non-selected filter is grounded, or otherwise inactivated, by means of switch 73 or 75. To provide an accurately readable display, the analog output of differential amplfier 81 is converted to digital form by converter 85 whose output drives a digital display 91 (FIG. 1) which typically comprises a three digit "Nixie" (trademark) tube display plus a sign.

The embodiment of FIG. 3 is adapted to measure reflectance instead of transmittance and incorporates many of the components of the embodiment of FIG. 1, with the latter being given identical reference numerals. In particular, a specimen tray 100 containing nuts, for example, is placed on lower cushion 17. A housing or cylinder 102 with a diameter no larger than that of lower and upper cushions 17 and 26 is mounted on top of lower cushion 17 co-axially with the optical axis $\alpha$ between lamp 37 and the specimen. Four photodetectors 104 are mounted adjacent the upper end of cylinder 102, are spaced 90° apart about the inner surface of cylinder 102 and are inclined downwardly toward tray 100 to receive light reflected from the specimen. In this manner, cylinder 102 serves as a light shield, a support for photodetectors 104, and a spacer between cushions 17 and 26 for positioning platform 16 at a predetermined level.

The illuminating system 27 and its associated sync system, as well as analyzer unit 50 and its components are used in an identical manner in the embodiment of FIG. 3 as described in connection with the embodiment of FIG. 1. Also the electrical connections and operation of the embodiment of FIG. 3 will be identical to the arrangement of FIG. 2, with the exception that the outputs from the photodiode 104 are summed and connected to the logarithmic amplifier 51 of the analyzer unit 52 in place of the output from the photodiode 19.

Therefore in the embodiment of FIG. 3 a pair of wavelengths (filters) are selected by mode selector 71, and analyzer unit 50 provides an output indicative of the difference between the logarithms of the intensity of reflected energy at two different wavelengths, termed the difference in reflective optical density, $\Delta RD$. As in the transmittance measurement of OD, switches 73 and 75 may be used to read out absolute RD for one wavelength. Useful $\Delta RD$ measurements have been obtained using infrared wave-lengths to determine the moisture content of nuts.

It is understood that all of the components forming the instruments of both embodiments of the present invention will normally be mounted in a cabinet or the like which is adapted to provide support for the fixed components of the instrument and which accommodates the movable components.

The operation of the instrument of the present invention will be described in connection with the determination of the maturity of an apple using the transmittance measuring apparatus of the embodiment of FIG. 1. The transmittance measurement by which ripe apples can best be distinguished from immature apples is the value of $\Delta OD = OD$ (at 690 nm) $- OD$ (at 740 nm) where nm represents nanometers of wavelength. This particular $\Delta OD$ is dependent on chlorophyll content, which is indicative of ripeness. For this measurement, two filters 29 and 31, for example, among the group of four filters 29-32 in wheel 28, must have peak transmittances at 690 and 740 nm. The apple to be tested is placed on lower cushion 17 and raised to the upper position by handle 24. Lamp 37 and sync light sources 42 and 46 are activated, and continuous rotation of wheel 28 is begun. The outputs of counter 57 (FIG. 2) which correspond to the two selected filters 29 and 31 are passed respectively to control sample and hold circuits 53 and 55 by means of mode selector 71. The $\Delta OD$ is read directly from display 91. $\Delta OD$ depends on the relative ease of transmitting these two wavelengths of light through the apple. Depending on the $\Delta OD$ reading, as compared to experimental standards derived from former experiments on the same type of apple, and test apple is determined to be ripe or unripe.

Those skilled in the art will recognize that variations of each of the foregoing embodiments are permissible, without departing from the scope of the present invention. For example, the filter wheel can be adapted to circulate any required number of filters. The only difference in the electronics would be that the number of selectable counter outputs would be increased. A preamplifier may be necessary before logarithmic amplifier 52 to maintain a consistent scale for both transmissive and reflective readings. In addition, other sync signal systems are possible, such as magnetic pick-ups or contact pick-offs. Light sources 42 and 46 can be combined into one source, if desired. Alternatively, high intensity lamp 37 can be arranged to shine light through sync apertures 41 and 44 as well as filters 29-32.

The advantages of the invention are numerous. Optical density measurement techniques are nondestructive. Thus, the same sample can be measured daily and its changes observed as a function of time. The simple operation permits the use of the device as either a research instrument or as a production tester. The multi-filter system allows testing for two or more parameters simultaneously. The versatility of the measuring apparatus is greatly enhanced by the dual mode of operation, providing instantaneous switching from readouts of absolute optical density at each wavelength to optical density differences for two wavelengths. Moreover, the mechanical arrangement of the carriage assembly allows specimens of varying sizes to be readily accommodated in a convenient manner.

It will be understood that other changes in the details, materials, steps and arrangements of parts which have been herein described and illustrated in order to explain the nature of the invention, may be made by those skilled in the art within the principle and scope of the invention as expressed in the appended claims.

We claim:

1. Optical measuring apparatus, comprising a light source, a plurality of optical filters, filter wheel means mounted for rotation between said light source and an object to be optically analyzed and carrying said filters for sequential registration thereof in the optical path between said light source and said object, light sensitive means operatively positioned to produce an output indicative of the light received from said light source via said object, a logarithmic amplier operatively receiving the output of said light sensitive means, drive means for causing regular rotation of said wheel means, first indexing means formed on said filter wheel means for indicating each complete revolution of said wheel means, second indexing means formed on said wheel means for indicating registration of each said filter in said optical path, means responsive to said first and second indexing means for providing corresponding first and second sinc signals, counter means operatively receiving said second sinc signal as a load input thereto and said first sinc signal as a reset input for producing parallel outputs corresponding respectively to said filters, said counter means providing gate signals at each one of said parallel outputs when the corresponding filter is in the optical path, a pair of sample and hold circuit means each operatively receiving the output of said logarithmic amplifier and each controlled by a different one of said gate signals to sample the output of said logarithmic amplifier at times corresponding to the illumination of the object by light of one respective wavelength, and differential amplifier means operatively receiving the output of each of said circuit means for producing an output indicative of the difference in optical density for the two respective wavelengths.

2. The apparatus of claim 1, wherein further including means for selectively inactivating one of said sample and hold circuit means so that the output of said differential amplifier is indicative of optical density for one of said filters.

3. The apparatus of claim 1, further comprising digital display means, and analog to digital converter means operatively receiving said differential amplifier output for producing a digital output to said display means.

4. The apparatus of claim 1, further comprising support means for operatively positioning said object between said illuminating means and said light sensitive means so that said light sensitive means produces an output indicative of the level of light transmitted through said object.

5. The apparatus of claim 4, further comprising linkage means for moving said support means to and from a predetermined position relative to said illuminating means, and means cooperating with said linkage means for maintaining said position despite variations in the size of said object.

6. The apparatus of claim 5, wherein said maintaining means includes resilient means and fixed stop means positioned between said support means and said illuminating means, said resilient means being operatively connected to said linkage means for providing a stable position for said support means in which said object is loaded onto said support means and for urging said support means toward said stop means when said support means is moved from said stable position such that said object is forced against said stop means and is retained thereby in said predetermined position.

7. The apparatus of claim 1, further comprising support means for operatively positioning said object in a manner such that said object reflects the light from said illuminating means towards said light sensitive means.

8. The apparatus of claim 7, further comprising linkage means for moving said support means to and from a predetermined position relative to said illuminating means, and means cooperating with said linkage means for maintaining said predetermined position despite variations in the size of said object.

9. The apparatus of claim 8, wherein said maintaining means includes resilient means and stop means positioned between said support means and said illuminating means, said resilient means being operatively connected to said linkage means for providing a stable position for said support means in which said object is loaded onto said support means and for urging said support means toward said stop means when said support means is moved from said stable position.

10. The apparatus of claim 9, wherein said maintaining means includes spacer means interposed between said support means and said stop means for determining said predetermined position.

11. The apparatus of claim 10, wherein said light sensitive means is operatively mounted on said spacer means to receive light reflected from said object.

12. The apparatus of claim 1 wherein a plurality of switch means are respectively connected between the parallel outputs of said counter means and a corresponding one of said circuit means for selectively interrupting or passing each gate signal to the corresponding one of said circuit means, and mode selector means for closing selective pairs of said switch means to pass the corresponding gate signals to the corresponding circuit means, said mode selector means including means for selectively inactivating one of said circuit means.

13. Optical measuring apparatus comprising support means for supporting an object to be optically analyzed, means for illuminating the object supported by said support means, a linkage means for moving said support means toward and away from said illuminating means, stop means to limit the motion of said support means towards said illuminating means to establish a predetermined position for said object relative to said illuminating means, a wall surrounding said object when said support means has been moved by said linkage to place said object in said predetermined position, said wall spacing said support from said stop means to establish said predetermined position and blocking external light from said object when said object is in said predetermined position, and light sensitive means mounted on said wall to receive light reflected from said object when said object is in said predetermined position.

* * * * *